United States Patent [19]

Guibault

[11] Patent Number: 4,772,389

[45] Date of Patent: Sep. 20, 1988

[54] PIPE AND ITS RETAINER IN A TANK

[76] Inventor: Denis Guibault, 5285 des Tilleuls St., Montreal, Canada, H1T 2H7

[21] Appl. No.: 78,212

[22] Filed: Jul. 21, 1987

[51] Int. Cl.⁴ .................. B01D 21/02; F16L 35/00
[52] U.S. Cl. .................... 210/232; 210/513; 210/532.2; 285/24; 285/27; 285/158
[58] Field of Search ............ 210/232, 513, 532.1, 210/532.2; 285/5, 24, 27, 158

[56] References Cited

U.S. PATENT DOCUMENTS

| | | | |
|---|---|---|---|
| Re. 32,312 | 12/1986 | Crates et al. | 210/532.2 |
| 2,440,762 | 5/1948 | Sitton | 210/532.2 X |
| 2,564,172 | 8/1951 | Raaberg et al. | 210/532.1 X |
| 3,162,469 | 12/1964 | Shohan | 285/24 X |
| 3,221,881 | 12/1965 | Weiler et al. | 210/532.2 X |
| 3,331,620 | 7/1967 | Rickard | 285/27 X |
| 3,426,903 | 2/1969 | Olecko | 210/532.2 X |
| 3,709,527 | 1/1973 | Nations | 285/158 X |
| 3,889,984 | 6/1975 | Lambiris | 285/27 |
| 3,986,963 | 10/1976 | Maroschak | 210/532.2 |
| 4,019,760 | 4/1977 | Streit | 285/158 X |
| 4,635,966 | 1/1987 | Hermann | 285/3 |
| 4,681,684 | 7/1987 | Maroschak et al. | 210/532.2 |

FOREIGN PATENT DOCUMENTS

| | | | |
|---|---|---|---|
| 1080862 | 7/1980 | Canada | 210/513 |
| 2343584 | 3/1974 | Fed. Rep. of Germany | 210/532.1 |
| 2412814 | 10/1974 | Fed. Rep. of Germany | 210/513 |
| 227184 | 9/1969 | Sweden | 210/532.1 |
| 227185 | 9/1969 | Sweden | 210/532.1 |

Primary Examiner—Robert Spitzer

[57] ABSTRACT

In a septic tank, an elbow pipe mounted therein and a keyway made in the top wall of the tank and longitudinally aligned with a circular opening formed in an end wall adjacent the top wall of the tank. The elbow pipe has a key adapted for outward sliding engagement in the keyway. The elbow pipe fits within a sealing gasket adapted to snap into the circular opening of the end wall and its end portion is threaded. A connector sleeve is screwed on the end of the elbow to secure the elbow within the gasket and to receive a drain pipe glued within the sleeve.

6 Claims, 2 Drawing Sheets

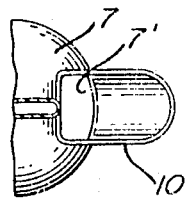
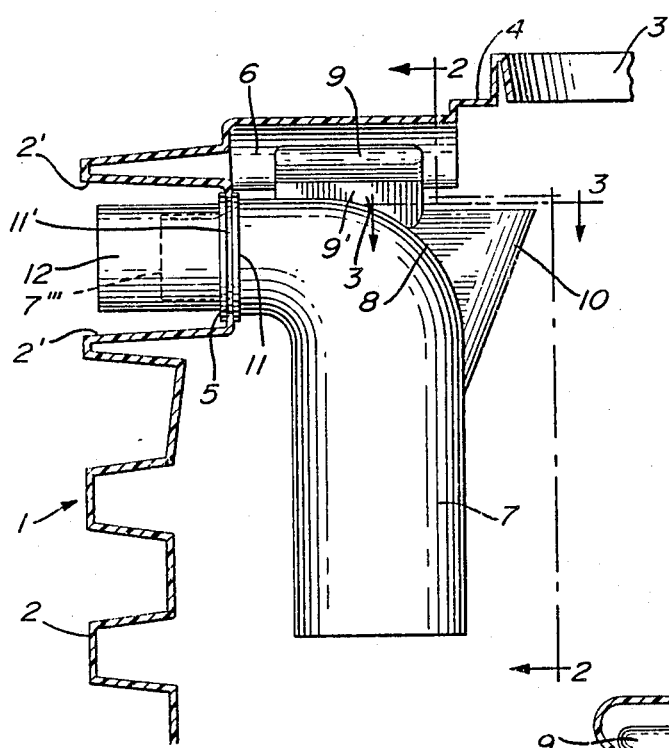
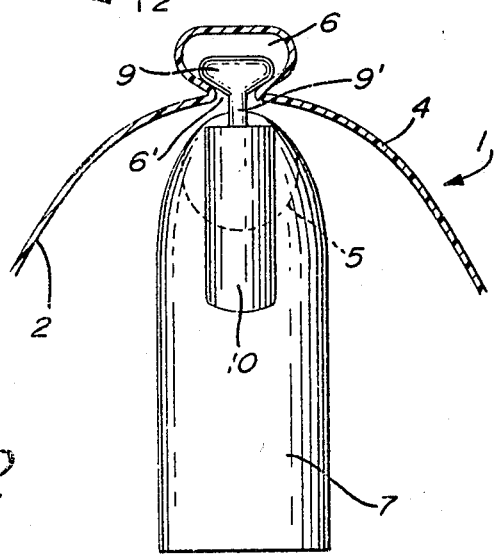

PIPE AND ITS RETAINER IN A TANK

FIELD OF THE INVENTION

The present invention relates to septic tanks and fixtures therefor, more particularly to an improved novel way of mounting a pipe in a septic tank.

BACKGROUND OF THE INVENTION

Till now, connecting pipes and elbows for septic tanks have been mounted either loose or with gaskets in holes of the tank. The elbows were difficult to install within the tank and the joints between the septic tank, the connecting pipes and the elbows are often not leakproof.

OBJECTS OF THE INVENTION

In view of the above, it is a first object of the present invention to provide a pipe connector and elbow assembly which is easily and quickly fittable to the wall and ceiling of a septic tank in a completely leakproof manner.

It is another object of the invention to provide an assembly of the above type, which is non-costly to produce.

Another object of the invention is to provide an elbow which can be easily cleaned when plugged.

SUMMARY OF THE INVENTION

The above and other objects and advantages of the present invention are realized according to a preferred embodiment comprising a septic tank and a hollow elbow. The septic tank has end walls, side walls and a top wall having an orifice and cover provided therein. One or both end walls are formed with a circular opening immediately below the top wall. The latter has, formed therewith, an elbow mounting means extending inwardly away from and longitudinally aligned with the circular opening of the end wall.

The elbow has an outer end which is adapted to engage the circular opening of the septic tank. The other surface of the elbow adjacent its opening is provided with sealing means arranged to make a leakproof connection when the elbow is in place.

The upper surface of the elbow inwardly of the sealing means is provided with an elbow mounting member which is complementary to the elbow mounting means.

In order to secure the elbow to the septic tank, a worker has simply to lower the pipe through the orifice capped by the cover and, then, by sliding the mounting member into the elbow mounting means, push the pipe until it engages the septic tank end wall opening. The sealing means can be installed in said opening either prior or after elbow insertion.

BRIEF DESCRIPTION OF THE DRAWINGS

The above will be clearly understood by having referral to the preferred embodiment of the invention, illustrated by way of the accompanying drawings, in which:

FIG. 1 is a side elevation of the invention, the septic tank being vertically sectioned and partly shown;

FIGS. 2 and 3 are sectional views taken along lines 2—2 and 3—3, respectively, of FIG. 1.

Like reference numerals indicate like elements throughout the drawings.

DETAILED DESCRIPTION OF THE PREFERRED EMBODIMENT

Figure 4:
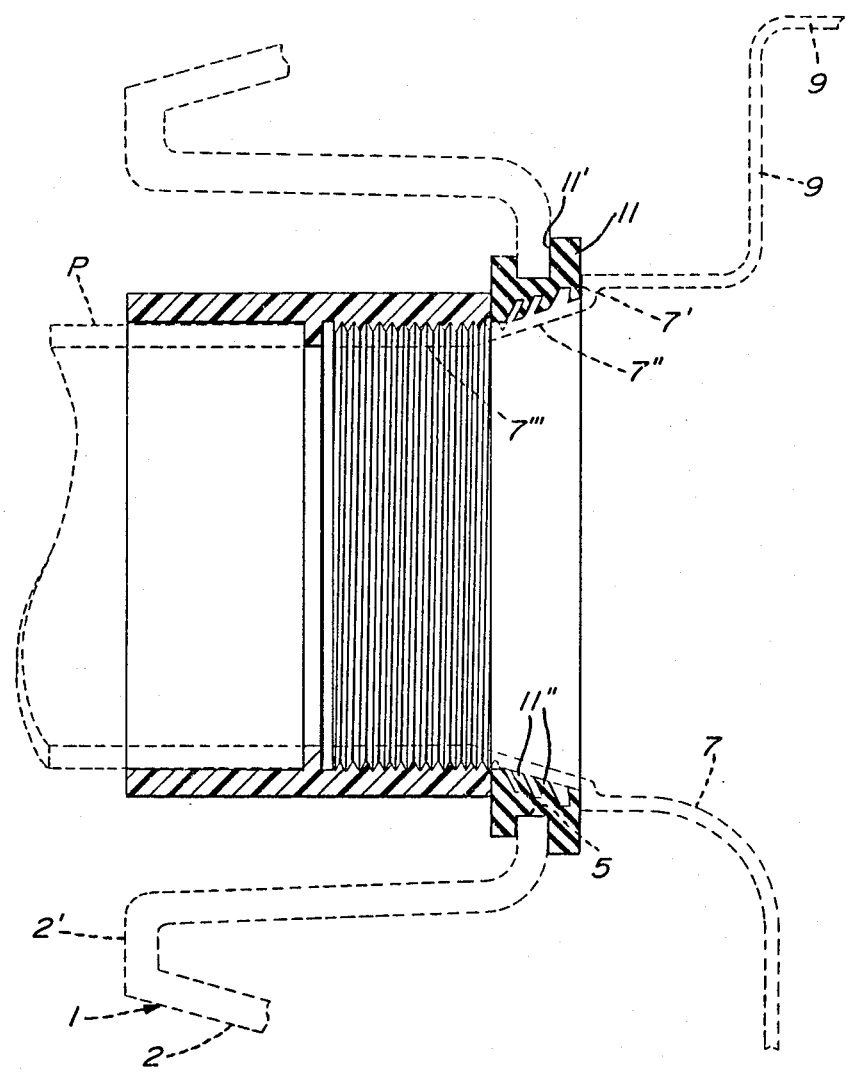
FIG. 4 is an enlarged vertical section of the connector and gasket in position on the tank, the latter and a connecting pipe partially shown in dotted lines.

Septic tank 1 has an end wall 2 which is horizontally and/or vertically corrugated and which merges with both side walls (not shown) and a transversely-convex top wall 4 having an orifice 3 and a cover (not shown). The uppermost two corrugations 2' have between them a circular opening 5 made in each end wall 2.

Outwardly of top wall 4 the upper part of tank 1 is formed with the elbow mounting means disclosed above. The means consists of forming top wall with an elongated longitudinal keyway 6, which is cross-sectionally in the general shape of a T and has a slot 6'.

A pipe elbow with a curved part 8 is adapted to be supported under keyway 6 by a complementary T-shape key 9. The latter has a leg portion 9' slidable in slot 6' and is rigidly secured to or integrally made with elbow 7. The latter, as well as tank 1, are preferably made of a thermoplastic, tank 1 preferably by rotary molding, and elbow 7 preferably by blow molding.

Inwardly of member 9, elbow 7 is provided with a fin 10, which may be used to displace the pipe elbow. As shown in FIG. 3, fin 10 forms a funnel opened at the top and communicating with the inside of elbow 7 through elbow side opening 7'.

Because funnel-forming fin 10 registers with tank access opening 3, it is easy to clean elbow 7 through fin 10 and opening 3 by the use of a suitable tool, whenever elbow 7 becomes clogged.

The tank end wall opening 5 is provided with the sealing means, consisting of an annular sealing gasket 11, made of elastomeric material and which has a central annular groove 11'. This annular groove is intended to receive the circumferential edge of the circular opening 5 of end wall 2. Gasket 11 has inner spaced lips 11''.

Elbow pipe 7 has an outwardly-facing step 7' followed by a tapered portion 7'', in turn followed by a smaller diameter extension 7''', the latter being externally threaded. An inwardly-threaded connector sleeve 12 is screwed on extension 7''' and secures elbow 7 in position with gasket 11 sandwiched between step 7' and sleeve 12. A drain pipe P is fitted and glued within sleeve 12. Both ends of the tank can be arranged with the system of the invention, one pipe serving as an inlet and the other as an outlet.

This invention is applicable, inter alia, to the septic tank described in applicant's Canadian Pat. No. 1,080,862 dated July 1, 1980, and also to holding tanks.

What I claim is:

1. The combination of a tank with a pipe and mounting means for mounting said pipe within said tank; said tank comprising side walls, at least one end wall and a top wall; an access orifice formed in said top wall; a circular opening made in said end wall adjacent said top wall; a pipe mounting means formed in said top wall exposed within said tank and extending inwardly from said end wall and longitudinally aligned with said circular opening; said pipe having an outer end; said pipe being provided with a sealing means at its outer end adapted to engage said circular opening; said pipe further having a pipe mounting member complementary to said pipe mounting means.

2. The combination as defined in claim 1, wherein said pipe mounting means is an elongated keyway open at its inner end and said mounting member is a key adapted to slide in said keyway.

3. The combination as defined in claim 2, wherein said keyway is cross-sectionally T-shaped and said key is also cross-sectionally T-shaped but in smaller dimensions.

4. The combination as defined in claim 3, wherein said sealing means is an annular gasket having a central, annular external groove adapted to receive the circumferential edge of said circular opening.

5. The combination as defined in claim 4, wherein said pipe is an elbow pipe having a fin projecting from its bend and forming a funnel communicating with the inside of said elbow pipe and in register with said access orifice when said elbow pipe is operatively positioned within said tank.

6. The method of mounting an elbow pipe within a tank; the latter having an end wall, a top wall with an access orifice, a circular opening made in said end wall adjacent said top wall and an elbow pipe mounting means provided in said top wall; said elbow pipe having a mounting member complementary to said mounting means; a sealing means at said outer end; said method comprising the steps of:

(a) lowering said elbow pipe into said tank through said access orifice; and
(b) sliding said elbow pipe outwardly with said mounting member engaging said mounting means while inserting the outer end of said pipe through said circular opening.

* * * * *